May 17, 1960 — E. G. DONAHUE — 2,937,199
TREATING PROTEIN HYDROLYSATES
Filed Sept. 12, 1957 — 4 Sheets-Sheet 1

Feed Hydrolysate of Fig. 1.

INVENTOR.
Edwin G. Donahue.

INVENTOR.
Edwin G. Donahue.

May 17, 1960 E. G. DONAHUE 2,937,199
TREATING PROTEIN HYDROLYSATES
Filed Sept. 12, 1957 4 Sheets-Sheet 3

INVENTOR.
Edwin G. Donahue.

United States Patent Office 2,937,199
Patented May 17, 1960

2,937,199

TREATING PROTEIN HYDROLYSATES

Edwin G. Donahue, Harbor Beach, Mich., assignor to Hercules Powder Company, Wilmington, Del., a corporation of Delaware Application September 12, 1957, Serial No. 683,563

12 Claims. (Cl. 260—529)

This invention relates generally to amino acids and to an improved process for treating protein hydrolysates. More particularly this invention concerns a method for treating protein hydrolysates which concentrates the hydrolysate into a plurality of desirable amino acid fractions, and permits the separation of those fractions, all in commercial quantities and on a semi-continuous or continuous basis.

It is well known that protein hydrolysates contain a relatively large number of individual amino acids and that certain of these amino acids have been successfully commercially produced from such protein hydrolysates, particularly glutamic acid or its monosodium salt. Monosodium glutamate is made in relatively large quantities by using the hydrochloric acid hydrolysate of wheat and corn as the starting material. The other amino acids which are present in such hydrolysates have been considered and studied and certain of them have been isolated, one from the other. In most cases, however, the isolations of the specific amino acids have been by analytical procedures and restricted to quantities which did not render the amino acids available in sufficiently large quantities to be commercially important. Of these known separating procedures none appear promising as methods for separating protein hydrolysates into amino acid fractions in quantities that have commercial significance.

The primary object of this invention is to provide a process for handling protein hydrolysates to enable the separation of such hydrolysates into fractions of amino acids in concentrated form and in commercial quantities.

Another object of this invention is to provide a process which permits continuous concentration of the amino acid constituents in protein hydrolysates, the desalting thereof, and continuous separation of that hydrolysate into heretofore unknown concentrated amino acid fractions.

Another object of this invention is to provide a process which continuously separates crystalline aspartic acid from protein hydrolysates.

A still further object of this invention is to provide a process which continuously and inexpensively concentrates glutamic acid in hydrolysates of protein material which are relatively lean in glutamic acid, such as Steffen's filtrate, the factory wastes from monosodium glutamate manufacturing processes, corn hydrolysate, locust bean hydrolysate, Milo maize protein hydrolysate, etc.

Another object of this invention is to provide an improved process for the continuous manufacture of monosodium glutamate including the step of preliminarily concentrating glutamic acid in protein hydrolysates containing minor proportions of glutamic and aspartic acids.

Still another object of this invention is to provide an improvement in the process for manufacturing monosodium glutamate which greatly reduces the time required and eliminates several steps in the conventional process of precipitating monosodium glutamate from a protein hydrolysate.

Another important object of this invention is the provision of a process which can be operated on a steady state continuous basis to concentrate the amino acid constituents in protein hydrolysates, and which during such continuous operation permits the removal of a plurality of amino acid products including a product fraction containing a high proportion of di-amino acids, a second product fraction containing a high proportion of glutamic and aspartic acids and which is relatively free of salt, a third product fraction containing a high proportion of the neutral amino acids and a fourth product which is crystalline aspartic acid; the process also permits modifying the high diamino product to a substantially salt-free form and further separates the neutral amino fraction into two separate products.

Another object of this invention is to provide a number of new and improved amino acid products each of which contains an admixture of certain amino acids which are adapted for use as such, or which may serve as improved starting materials for the separation and preparation of individual amino acids.

The present invention is based upon the discovery that protein hydrolysates can be concentrated and separated into important amino acid fractions on a continuous basis by employing ion exclusion processing techniques.

This invention is applicable to the hydrolysates obtained from any of the naturally occurring protein materials by the hydrolysis of those proteins with acids, alkalies or enzymes. The acid hydrolysis of the proteins is preferred because this process inexpensively provides the natural L-form of the various amino acids and it has been found that acid hydrolysates are somewhat superior hydrolysates as starting materials in this invention.

The present day commercial by-products of the manufacture of monosodium glutamate, or most commercially produced protein hydrolysates, which are conventionally employed as flavoring extracts and the like contain a relatively large quantity of common salt as the result of neutralization of the hydrochloric acid used in the original hydrolysis of the protein material. In such products it is usual that the salt content is in the range of 30–50% and may be as high as 70% of the total solids. This quantity of salt in such hydrolysed protein liquids represents a serious barrier to their more widespread use because the presence of salt limits the amount which can be added to food products from the taste standpoint. In certain applications in the pharmaceutical field the presence of salt in such hydrolysed protein liquids is detrimental and precludes their use. Moreover, the presence of salt in the hydrolysed protein liquids increases the difficulty and cost of isolating amino acids therefrom by the presently known methods.

Broadly stated, the method of this invention is a method of fractionating protein hydrolysates and isolating amino acid products therefrom and comprises the steps of establishing an ion exchange resin bed, passing a protein hydrolysate through the bed and eluting the hydrolysate from the bed with water, preferably deionized or otherwise purified water, collecting the eluted fractions and selectively discarding fractions which are high in salt content and saving fractions high in the desired amino acids. In a modified and preferred form of the invention certain of the collected fractions are discarded, other fractions are merely isolated and the fractions which were collected but not isolated are recycled. The isolated fractions are end products or may be converted into end products by further concentration and purification.

The ion exclusive process of this invention can satisfactorily make use of both cation exchange resins and anion exchange resins. A considerable number and variety of ion exchange resins may be used including the cation exchange resins which are strongly ionized such as the sulfonated co-polymers of monovinyl aromatic hydrocarbons and polyvinyl aromatic hydrocarbons such as those disclosed in U.S. Patent No. 2,366,007, and carboxylated resins such as those disclosed in U.S. Patent No. 2,471,818. These cation exchange resins may be employed either in their acidic, i.e., their hydrogen form, or in the form of a salt and are commercially available from The Dow Chemical Company under the trade name designation of Dowex resins. Particularly suitable are the Dowex 50–X4 or X8 resins having a particle size between 20 and 100. The X4 and X8 portions of the designation are understood to represent the weight percentage of cross-linking agent which is present in conjunction with the styrene, and in this particular material is divinyl benzene, that is, Dowex 50–X4 contains 4% divinyl benzene, etc. Anion exchange resins may also be employed and examples of suitable resins of this type are the resinous condensation products of phenol, formaldehyde and alkylene polyamines such as are disclosed in U.S. Patent No. 2,341,907, the resinous condensation products of phenol, alkylene polyamines and ammonia and/or ammonium salt such as are disclosed in U.S. Patent No. 2,546,938, etc. The strongly ionized cation exchange resins are superior for the purposes of this invention and are therefore preferred.

As above stated, the process of this invention can be applied to aqueous hydrolysates of protein material obtained by acid treatment, alkaline treatment, or by enzymatic processing. In each case conventional processing conditions can be employed and as an example of one suitable procedure the conditions for obtaining a suitable hydrolysate by acid treatment will be given.

Wheat or corn gluten, soybean meal, brewers yeast, etc. is contacted with a hydrochloric acid solution having a strength of 15% to 28% HCl, by weight, the HCl solution being added in excess, and the mixture boiled at atmospheric pressure for 8 to 24 hours. After the reaction period, and after the solution has been allowed to cool, it may be neutralized with any of the normally used alkaline materials such as sodium or potassium hydroxide to a pH within the range of 3.2 to 4.3 and filtered at once before any glutamic acid has crystallized out. The filtrate in this neutralized form is a suitable starting material for the purposes of this invention. If desired, the hydrolysate may be further processed to preliminarily remove therefrom a portion of the glutamic acid which is contained. If this is desired the reaction hydrolysate, as above obtained, can be filtered to remove the humin, the filtrate evaporated to 23–31° Bé. and additional hydrochloric acid added in the proportion of about 0.3–0.4 pound of HCl per pound of protein while the hydrolysate is still hot and the reacidified hydrolysate then allowed to cool. This cooled material crystallizes to a slurry of glutamic acid hydrochloride which upon filtration, separates an amino acid filtrate, which upon neutralization to a pH within a range of 3.2–4.3, followed by filtration, gives a solution which represents another suitable starting material for the purposes of this invention. This latter type of filtrate is used in a number of the examples which are set forth in detail hereinbelow. It has been found that the efficiency of the separation of the hydrolysate into useful amino acid fractions is partially dependent upon the presence of a quantity of chloride, such as sodium or ammonium chloride, or equivalent electrolyte material in the solution being processed and one means of maintaining this needed electrolyte content is to include it in the hydrolysate which is used as a starting material in this process. The term "chloride" as used herein and in the appended claims refers to a quantity of chloride calculated as sodium chloride even though the chloride may be present as ammonium chloride or as other chloride. Some degree of concentration of the di-amino constituents, the dicarboxylic amino acid constituents and the neutral amino acids is obtained when the chloride concentration in the hydrolysate is as low as about 17 grams of chloride per 100 ml. of the hydrolysate, but for more consistent and higher efficiency operation it is prefered that the chloride concentration in the hydrolysate be at least about 20 grams/100 ml. of the hydrolysate and the chloride concentration can even more advantageously approximate the saturation limit for the particular hydrolysate being employed. While chlorides are the most conventional salts which are present in commercial acid hydrolysates, it is to be understood that an equivalent quantity of other salts such as the sulfates, nitrates, phosphates or sulfonates may be used in lieu of the chlorides.

The requirements for establishing a satisfactory resin bed are conventional and only one consideration relative thereto will be mentioned. The bed should be of a sufficient length to diameter ratio such that an efficient rate of flow of the hydrolysate passing through the bed is obtained. As the length of the resin bed increases relative to the diameter, the rate of flow decreases and no attendant increase in efficiency of separation of amino acid products occurs so that it is preferred to employ a resin bed of substantial volume but one which has a low length to diameter ratio. Any suitable filtering plate or the like can be employed as the supporting medium at the bottom of the resin bed column, but it should be a sufficiently porous one to enable relatively high speed flowthrough and backwash.

The hydrolysate to be treated may be introduced into the resin bed column by merely pouring the same on the top of the resin particles. For the faster flow rates, however, it is preferred to disperse the stream of the hydrolysate onto the resin particles to avoid cavitation and eddy effects adjacent the top surface of the resin bed and this may be satisfactorily accomplished by employing spreading devices to introduce the solution adjacent the walls of the column or uniformly over the surface of the resin as for example through a perforated disc or perforated tubing.

While gravity flow has been found entirely satisfactory, pressure may be applied to the top of the column or vacuum to the bottom of the column to increase flow rates, if desired. The volume of hydrolysate feed added to the column to be separated and concentrated, is preferably restricted to a small proportion of the volume of the bed, for example, about 5% to about 40% of the volume of the bed and after addition to the bed is immediately followed by water, preferably deionized or otherwise purified to elute the hydrolysate through the bed.

The hydrolysate may be introduced satisfactorily at room temperature but for gluten hydrolysates containing a high proportion of glutamic acid it is preferred to introduce such hydrolysates at an elevated temperature of about 130–150° F. to aid in retaining the glutamic acid crystals in solution until the hydrolysate has passed through the resin bed. The hydrolysate passes through the resin bed and may be collected at the lower end thereof in any conventional receptacle, but is preferably separated into fractions of some predetermined quantity. Any convenient sized eluate fraction may be collected, but it is prefered to use relatively small size fractions so that the selection of the particular product will be simplified by enabling the isolation of fractions having the desired amino acid concentration. For continuous operation the fraction size should be restricted to a maximum size of about 16% by volume of the resin bed volume. Purity of product and maximum separation is obtained by extremely small fractions of, for example, 2%–5% of the resin bed volume but more practical all around conditions are obtained by using fractions of about 8%–10% of the resin bed volume.

The effluent which is first collected from the column normally contains the occluded water which was present in the resin bed and is immediately followed by a brine solution which contains a high proportion of the salt present in the hydrolysate. After the brine solution has been collected the effluent assumes a light brown color and the balance of the effluent is colored and when collected in small fractions can be easily analysed to aid in controlling the time and place for selecting the desired final products.

The elution of the hydrolysate is continued and the fractions collected until the effluent has a gravity of not more than about 0.5° Baumé.

The fractions which follow the brine solution are rich in di-amino acids and contain salt as well as a minor proportion of glutamic acid and aspartic acid and this series of fractions is followed by a further series of fractions which are rich in glutamic and aspartic acid as well as other dicarboxylic amino acids. This latter group of fractions is then followed by a final group which are rich in the neutral amino acids, particularly serine, threonine, proline and the like. All the fractions which follow the brine fractions were above mentioned to be colored. It will be understood by those skilled in the art that if desired a decolorizing medium could be inserted before the collection of the various fractions and in this event the fractions would be colorless. In the presence of such decolorizing medium the control of the points of separation of the various desirable amino fractions is by conventional analytical methods, such as gravity, refractive index, solids determination, conductivity or the like.

Some benefit in concentrating the various amino fractions in such hydrolysates is obtained by a single pass of the hydrolysate through such a resin bed, but in the preferred form of this invention it is desirable to re-cycle the effluent fractions in order to enhance the separation and concentrate the fractions into a more desirable form. This re-cycling works most efficiently by eluting the hydrolysate feed with fractions collected from the preceding cycle, instead of water. The fractions are added to the column in the same sequence as they were collected, and every one is made to follow the preceding fraction as soon as the preceding one has just disappeared from the surface of the resin bed.

In order to successfully concentrate and obtain the most efficient separation of various amino acid fractions it has been found to be important to control the pH of the hydrolysate feed material. The pH can satisfactorily vary within the range of about 3.2 to about 4.3. For the most efficient operation, with acid hydrolysates, a pH of 3.3 to 3.5 has been found to be the most satisfactory. Even when the pH is maintained within the above given limits it is also helpful and desirable to control the point at which the recovered fractions from the previous cycle are returned to the resin bed together with the new batch of feed hydrolysate material. The effects of variation of pH of the feed hydrolysate and the point of addition of the fractions to be re-cycled on the degree of separation and concentration of the amino acids are illustrated in the various figures included on the drawings.

Figure 1:
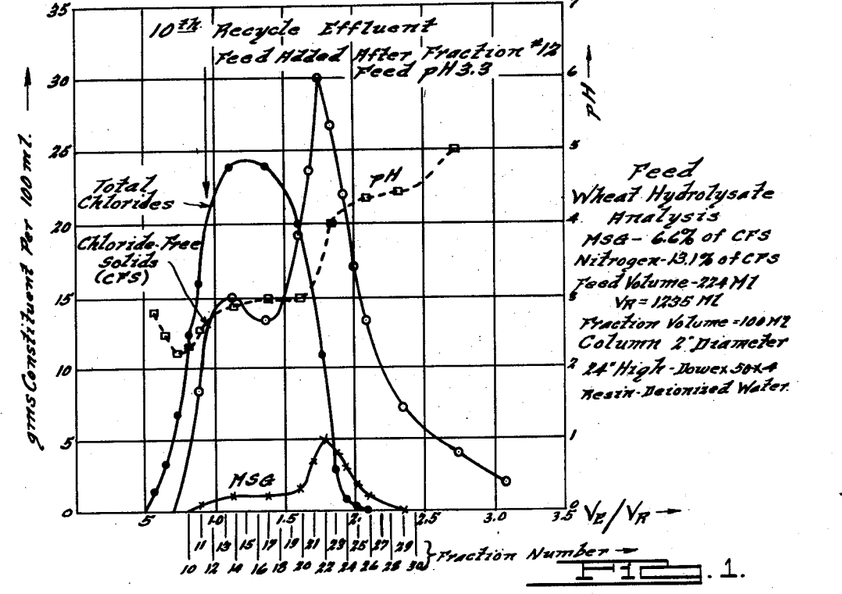
Figure 1 is a graph showing the typically desirable shape of the curves of the concentration of total chlorides, chloride-free solids and monosodium glutamate in the effluent collected and retained from the tenth re-cycle run of a wheat-protein-acid hydrolysate passed through a strong cation exchange resin bed, when that concentration is plotted against the fraction number and the ratio of the volume of effluent divided by the settled volume of the resin bed, hereinafter designated Ve/Vr.

With respect to Fig. 1, it may be noted that the concentration of the various ingredients were plotted in grams/100 ml. of the effluent and the fraction numbers of the effluent are correlated with the ratio of the total volume of the effluent to the volume of the resin bed. Each fraction which was collected was 100 ml. in size. The curve labeled "chloride-free solids" refers to the weight of the total solids contained in the effluent less the weight of the chlorides present, calculated as sodium chloride and is expressed this way to more closely represent the weight of the amino acid solids in the effluent, even though small quantities of other solids are present such as phosphate salts, etc. The curve labeled "MSG" represents the concentration of glutamic acid, molecular weight 147, in the effluent fractions calculated as monosodium glutamate, molecular weight 187. The "total chlorides" curve refers to the total salt concentration of the effluent fractions including sodium and ammonium chlorides and it will be noted that the curve extends to approximately 24½ grams chloride per 100 ml. of the solution and this is substantial saturation for this hydrolysate. The effluent represented by the portion of the chloride-free solids curve which underlies the peak of the total—chlorides curve contains the amino acids which are rich in di-amino acids. It will also be noted that the chloride-free solids curve attains its peak substantially the same as the monosodium glutamate curve peak. It should also be noted that the peak of the monosodium glutamate curve is spaced to the right of and separated from the chloride-free solids peak which underlies the total chlorides curve peak and this separation is desirable and necessary in order to enable the product removal of an amino acid fraction high in the di-amino acids and a separate fraction high in monosodium glutamate. It will be noted that the chloride-free solids curve contains a substantial quantity of chloride-free solids after the monosodium glutamate curve has returned to zero, which on Figure 1 occurs at about fraction 30. The third fraction which can be continuously removed as product is the neutral amino fraction and this fraction is taken from the effluent fractions which follow the decrease of the monosodium glutamate to zero concentration.

AMINO ACID CONCENTRATION BY RE-CYCLING

The concentration of amino acid ingredients represented by the curves shown in Figure 1 was obtained by a plurality of re-cycling steps which will not be described in detail.

In initiating the process of this invention it is preferred to first equilibrate the resin with the feed hydrolysate because this insures that any adsorption and ion exchange that could otherwise occur during the ion exclusion process will be done during this step. The resin is preferably initially obtained in the acid form and is then equilibrated by passing the hydrolysed protein feed through the column, after the feed has been adjusted to a pH of 3.2–4.3, by introducing the same into the top of the column and continuing the addition of such hydrolysate to the column until the gravity, pH and color of the effluent closely approach the gravity, pH and color of the feed hydrolysate. The feed may then be discontinued, the column washed with water until the gravity of the effluent approaches 0° Baumé. Normally the quantity of hydrolysate required for this equilibration step is about 125% the volume of the wet, settled resin in the column. After the equilibration, the column is backwashed, to loosen up the resin, by introducing water to the bottom of the column under sufficient pressure to raise and separate the bed particles. The bed particles are then allowed to settle and after they have settled, the backwash is drained to the exact level of the top surface of the resin. The resin is then ready for receiving new feed. The resin column is normally backwashed after each cycle of operation.

The feed hydrolysate is introduced to the top of the column and as soon as the last of the feed hydrolysate disappears at the resin surface, water is added to the top of the column to elute the feed hydrolysate through the resin. The first fractions which are thus eluted contain the water which was present in the bed and these fractions are followed by a number of fractions which are substantially salt water or brine fractions and are colorless and all of these fractions are discarded. The effluent fraction which first appears with a light tan color contains the first of the amino acid portions of the hydrolysate and all colored fractions following the appearance of this color are retained for re-cycling purposes. More water is added continuously and individual fractions of the effluent are collected until the gravity of the fraction reaches about 0.5° Baumé. Lower gravity fractions are considered to be so lean in amino acid content as to be unworthy of re-cycling but they may be concentrated into the high neutral amino acid products of this invention by conventional means.

The re-cycling is accomplished by first backwashing and then feeding one or more of the collected and retained fractions from the previous cycle into the top of the column, and at sometime prior to the re-cycling of the eighth retained fraction, a quantity of new feed hydrolysate is introduced. The other fractions collected from the previous run follow the feed hydrolysate and elute the same through the column, and thereafter sufficient water is added to the column, as before, to elute the re-cycled feed through the bed and until the effluent fractions approach a gravity of 0.5° Baumé.

As above indicated it is important to the attainment of the maximum degree of concentration, while concurrently maintaining a separation between the points of maximum concentration of the amino acid fractions which are to be separated to control both the point at which the new feed hydrolysate is introduced to the column as well as the quantity of that feed. The quantity of the new feed hydrolysate should be restricted to not more than about 40% of the bed volume. From an economic standpoint the feed volume should be at least about 5% of the bed volume and preferably should lie in the range of 12–25% of the bed volume. If the new feed hydrolysate is fed to the resin bed prior to the re-cycling of any of the fractions collected from the previous cycle, the separation between the amino acid portions which are high in di-amino acids and the glutamic acid fraction is poor so that it becomes difficult to extract product fractions and maintain a sufficient separation of those product fractions on a continuous basis. If, however, at least two of the fractions which were retained from the previous cycle are fed to the bed prior to the introduction of the new feed hydrolysate, a good separation of the peak concentrations of the high di-amino fraction and the monosodium glutamate fraction occurs. The feed hydrolysate introduction can satisfactorily follow any one of the fractions between the second and eighth fractions which were collected and retained in the previous cycle with the best results having been obtained when the new feed hydrolysate is introduced after the second fraction. It will be apparent that as the re-cycling continues, the total volume of collected fractions will increase and unless the weak fractions which are high in the neutral amino acids are arbitrarily removed from the system for concentration purposes to obtain a product high in neutral amino acids, the quantities to be handled would soon become unmanageable. For this reason it has been found desirable to re-cycle only the fractions having a gravity of at least about 2° Baumé so as to keep the total quantity at a reasonable level. The fractions following 2° Baumé are then removed as above described. The curve of Figure 1 was obtained by operating a column in the above described manner with the feed hydrolysate pH being adjusted to 3.3 before addition and the new feed hydrolysate being introduced on each re-cycle after the second colored fraction from the previous re-cycling step had been introduced to the bed.

Figure 2:
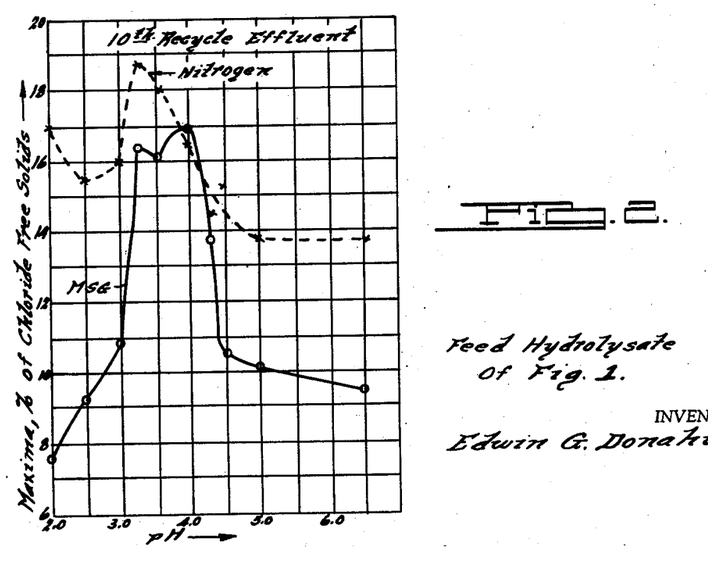
Figure 2 is a composite graph illustrating the variation of the maximum concentration of monosodium glutamate and nitrogen, expressed in percent of the chloride free solids, in the amino acid effluent fractions, which were collected from the tenth re-cycle run of a wheat-protein-acid hydrolysate, with variations in the pH of the hydrolysate. Each point was obtained from analysis of the tenth re-cycled system effluent, all ten re-cycles having been made at the given pH, but it should be clearly understood that the plotted maximum values for nitrogen were not contained in the same fraction as the plotted maximum values for monosodium glutamate. In fact at a pH of 3.3, fraction number 22 which contains the maximum amount of monosodium glutamate contains the minimum value of NH₃-free nitrogen. The nitrogen values in Figure 2 are the total nitrogen less ammonia nitrogen and are calculated in this manner to more nearly represent the amino acid nitrogen content of the effluent.
Figure 3:
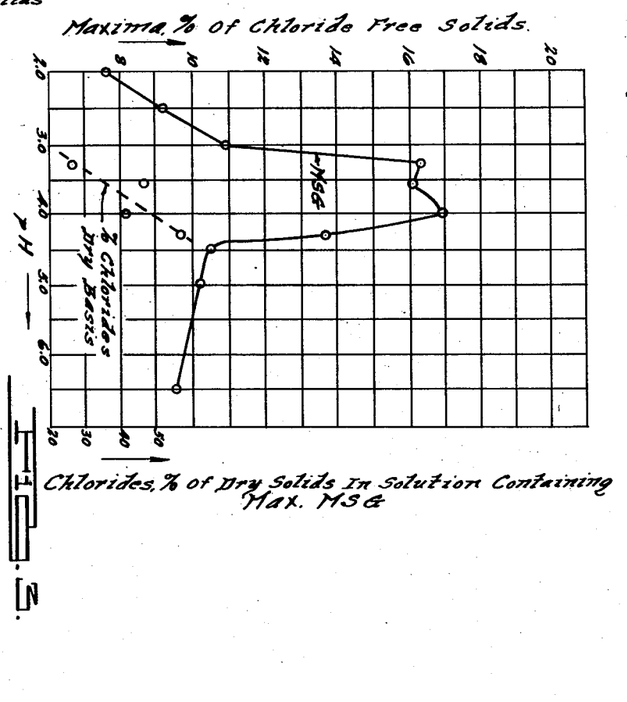
Figure 3 is a graph showing the same maximum percent monosodium glutamate plotted against the pH as in Figure 2, and also showing the chloride, percent of dry solids in the solutions which contain maximum monosodium glutamate.

In a similar manner a comparable column employing a comparable by-product acid hydrolysate from a monosodium glutamate manufacturing process was operated for ten re-cycle runs for each of several pH values for the hydrolysate fed thereto, to develop the curves shown in Figures 2 and 3. An inspection of Figure 2 will reveal that the maximum quantity of MSG and the maximum quantity of nitrogen, expressed as percent of chloride free solids which occurred in separate and different fractions, namely fractions 22 and 17 respectively, in the effluent is obtained when the feed pH is 3.3. Further inspection of Figure 3 will indicate that a pH of 3.3 where the monosodium glutamate and nitrogen in separate fractions are at their maximum values, the percent chloride in the maximum MSG fraction is at a minimum. From Figure 2 it may be seen that at a pH of 4.0 the monosodium glutamate maximum is at a slightly higher value than at a pH of 3.3 but the nitrogen has been substantially reduced from its peak value and the chlorides have risen approximately 50% relative to their concentration at a pH of 3.3. While amino acid products containing chloride are of commercial value and the amino acid fraction obtainable at a pH of 4.0 would represent a product of utility for many purposes such as flavoring sauces and the like, the preferred pH is 3.3 for producing the highest percent nitrogen and in separate fractions the highest proportion of monosodium glutamate which concurrently has the lowest percent chlorides. This pH value therefore represents the preferred operating value. Figures 2 and 3 were developed by using hydrolysates having an initial monosodium glutamate content of 6.6% and a nitrogen content of 13.1% by weight of the chloride free solids. It is apparent that at any pH indicated, ten re-cycles of the effluent by the above procedure produces fractions containing significantly higher monosodium glutamate and nitrogen content in the effluent than was present in the feed hydrolysate. The greatest degree of amino acid concentration occurs, however, between a pH of 3.2 and 4.3 and for this reason these values are indicated to be the ranges between which the pH of the hydrolysate is preferably maintained for the purposes of this invention.

Figure 4:
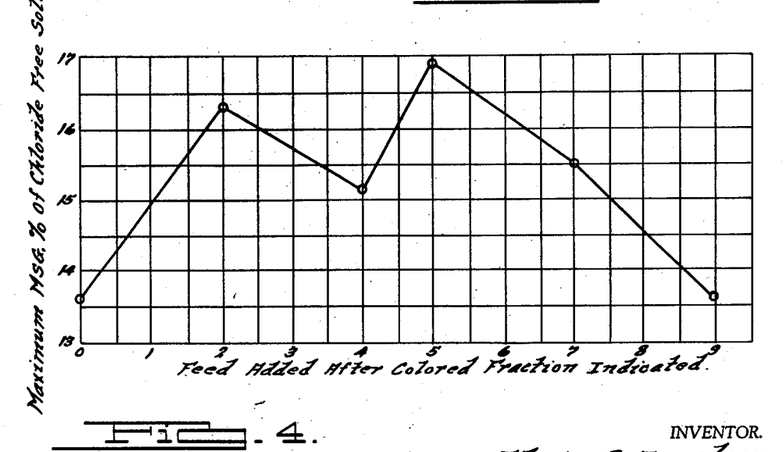

Figure 4 is a graph showing the effect of the point at which the new feed hydrolysate is introduced to the column on the maximum percent of monosodium glutamate obtainable in the effluent, expressed as a percent of the chloride-free solids. An inspection of Figure 4 indicates that when the new feed hydrolysate is introduced prior to the re-cycling of any of the fractions from the previous cycle, the maximum percent monosodium glutamate which can be obtained is 13.6%. When the feed hydrolysate is added after two of the fractions from the previous cycle have been fed to the bed, the maximum percent monosodium glutamate obtainable in the effluent is increased to 16.3% and when added after the fifth fraction, the maximum MSG is 16.8%. The proportion of monosodium glutamate which can be obtained remains substantially higher than in the feed until the eighth fraction and if the new feed hydrolysate is added after the ninth fraction of the previous run, it can be seen that the effect is the same as adding the feed hydrolysate before any of the fractions from the previous run have been introduced into the column. It is thus desirable to introduce the hydrolysate after the second through the eighth fractions from the previous cycle. This point is discussed more fully later in connection with Fig. 5.

The data from which Figures 2, 3 and 4 were plotted are set forth in Tables 1, 2 and 3 respectively. The points plotted for monosodium glutamate and nitrogen are the maximum concentration of monosodium glutamate and nitrogen present in any of the effluent fractions collected and was obtained from the particular fraction specified in the tables.

Table 1.—*Maxima of MSG and nitrogen in tenth re-cycle effluent with variations in pH*

| pH | Fraction No. | MSG Maxima, Percent of Chloride-Free Solids | Nitrogen Maxima, Percent of Chloride-Free Solids | Fraction No. |
|---|---|---|---|---|
| 2.0 | 25 | 7.6 | 17.0 | 25 |
| 2.5 | 29 | 9.2 | 15.5 | 13 |
| 3.0 | 24-28 | 10.9 | 15.9 | 13 |
| 3.3 | 22 | 16.3 | 18.8 | 17 |
| 3.65 | 24 | 16.1 | 18.0 | 12 |
| 4.0 | 29 | 16.9 | 16.5 | 14 |
| 4.3 | 30 | 13.7 | 14.5 | 24 |
| 4.5 | 15 | 10.5 | 15.4 | 15 |
| 5.0 | 20 | 10.3 | 13.8 | 20 |
| 6.5 | 36 | 9.5 | 13.7 | 36 |

Table 2.—*Chlorides, percent of dry solids in solutions containing maximum MSG in tenth re-cycle effluent with variations in pH*

| pH | Chlorides, Percent of Dry Solids |
|---|---|
| 3.3 | 26.0 |
| 3.65 | 46.0 |
| 4.0 | 41.0 |
| 4.3 | 56.0 |

Table 3.—*Effect of point of introducing feed hydrolysate*

| Feed Added After Re-Cycled Colored Fraction Number | Fraction Number of Maximum MSG Content | Maximum Percent MSG, Percent of Chloride-Free Solids |
|---|---|---|
| 0 | 34 | 13.6 |
| 2 | 22 | 16.3 |
| 4 | 23 | 15.1 |
| 5 | 22 | 16.9 |
| 7 | 23 | 15.5 |
| 9 | 16 | 17.5 |

PRODUCT REMOVAL

In order to render the process of this invention a continuous one such that a plurality of separate amino acid products can be continuously removed, it is necessary to select the quantity of each of the products and the particular fractions from which it can be removed with care in order to maintain the operation in balance and the relationship of the ingredients as indicated in Figure 1 in substantial conformity to the typical conditions there illustrated. It will be apparent that in order for the continuous process to be economic, it is desirable to remove products which contain concentrations of the particular portions of the amino acid spectra which are desired that are greater than the concentration of those particular amino acids in the hydrolysate feed material. While it is sometimes of significance to merely be able to effect a separation between particular amino acids, for the purposes of this invention the production of amino acid products that are in more concentrated form and also separated from the other amino acids is the prime objective. It has been found that the first amino acid product which can be removed is one high in di-amino acids and this product can be removed from any of the fractions between fraction 11 and fraction 20 in the graph of Figure 1. The second product, an amino acid fraction high in glutamic acid, can be removed from any one of the fractions between fraction 20 and 26 as seen in Figure 1. A third product can be removed by selecting a fraction between 30 and the end of the run. It has further been found, however, that in order to maintain the column in balance it is necessary to remove a quantity of these three products which, when totaled, represents substantially the same amount of those particular amino acids which were introduced in the feed hydrolysate in that particular cycle, that is, the sum of the di-amino acids and the glutamic acid in product A combined with the glutamic acid and other amino acids in product B and the neutral amino acids in product C, together with the neutral amino acids lost in very dilute fractions below 0.5° Baumé, as the result of analysis, should substantially equal the quantity of those same amino acids introduced in the feed hydrolysate in that cycle.

Figure 6:
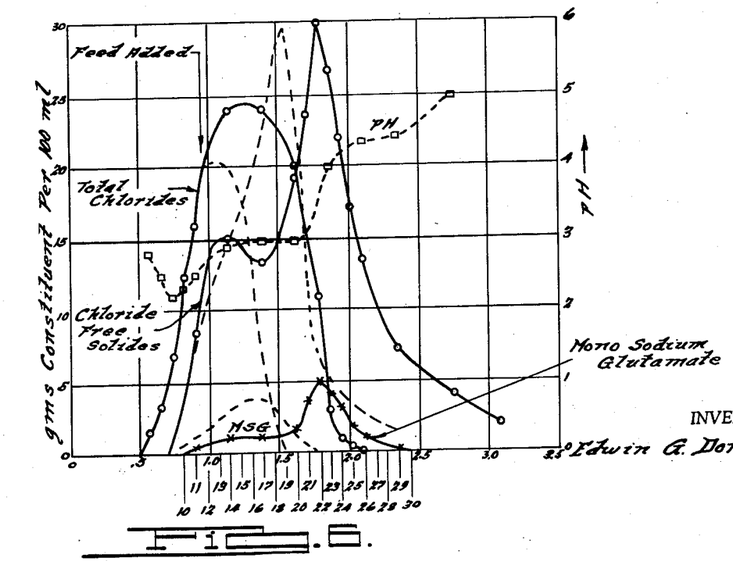

Figure 6 illustrates one of the problems which is encountered when the quantity of the di-amino acid product which is removed is greater than should be taken. As before indicated the maintenance of separation between the fractions having a high concentration of monosodium glutamate relative to those having a high concentration of di-amino acids, is partially dependent upon the salt content or chloride content in the feed hydrolysate. Since the product fractions which are high in di-amino acids are also relatively high in salt concentration, the salt which is retained in the re-cycling system as re-cycling proceeds and di-amino product is removed is gradually and continually reduced. Moreover, the total quantity of material in the system which is high in di-amino acids is reduced and these reductions cause a decrease in the number of fractions which contain a high concentration of chloride-free solids and a low concentration of monosodium glutamate and this decrease in salt content and di-amino acid constituents in those fractions ultimately causes the chloride-free solids curve to lose its flat portion, between fractions 11 and 20 in Figures 1 and Figure 6, solid lines, and the glutamate curve to move over and lie directly under the di-amino acid portion of the chloride-free solids curve at its point of maximum concentration. The relative positions of the curves, in this case, is shown on Figure 6 in the dotted line positions. It may be seen that the total chlorides curve width has been reduced and extends substantially in a straight line to its peak from fraction #7 to fraction 18 and that the monosodium glutamate curve now attains its peak at fraction 16 as compared to fraction 22 when the di-amino acid fraction was not being removed in an excess quantity.

A somewhat similar situation arises in the event product quantities of the fraction high in monosodium glutamate which are isolated of removed are too large. It has been found that the monosodium glutamate curve also moves toward the left and ultimately blends with the high di-amino fraction curve, that is, it is directly beneath or tends to move directly beneath the high di-amino portion of the curve from which the high di-amino fraction is normally taken and thus renders it impossible to obtain separate products. Moreover, as too much monosodium glutamate product fraction is removed, the neutral amino acid fraction curve also moves to the left, and makes the separation between monosodium glutamate and neutral amino acid fractions more difficult.

From standpoint of highest efficiency continuous operation it is desirable of course to remove the maximum quantity of each of the desired amino acid fractions which can be removed without upsetting the typical relationship of concentrations of those fractions as indicated in Figure 1. It is feasible to arrive at the steady state condition by using analytical procedures only, that is, to check the amino acid content as monosodium glutamate, nitrogen, chlorides, and chloride-free solids in the entire product fractions removed, and balance the total thereof against the amino acid content of the feed hydrolysate being introduced in each cycle. In the event the total in the product fractions exceeds that being introduced, the product quantities can be correspondingly decreased. There is another and possibly more convenient method of arriving at the steady state condition. An arbitrarily small volume of each product can be withdrawn from the selected fractions on one cycle, and the quantity of the product fractions so withheld gradually increased while maintaining an analytical check on the concentration of the di-amino acid fraction, monosodium glutamate fraction and the neutral amino acid fraction after each removal and comparing those totals against the typical curves indicated in Figure 1. So long as the curves are not substantially disturbed the operation of the column will remain continuous and efficient. As soon as the monosodium glutamate curve begins to move or migrate toward the di-amino acid fraction location, to the left in Figures 1 and 6, the increase in the quantity of the product which is being removed should be stopped and the actual quantities of each of the retained products reduced slightly from those which caused the initiation of the shift in the curves.

Figure 5:
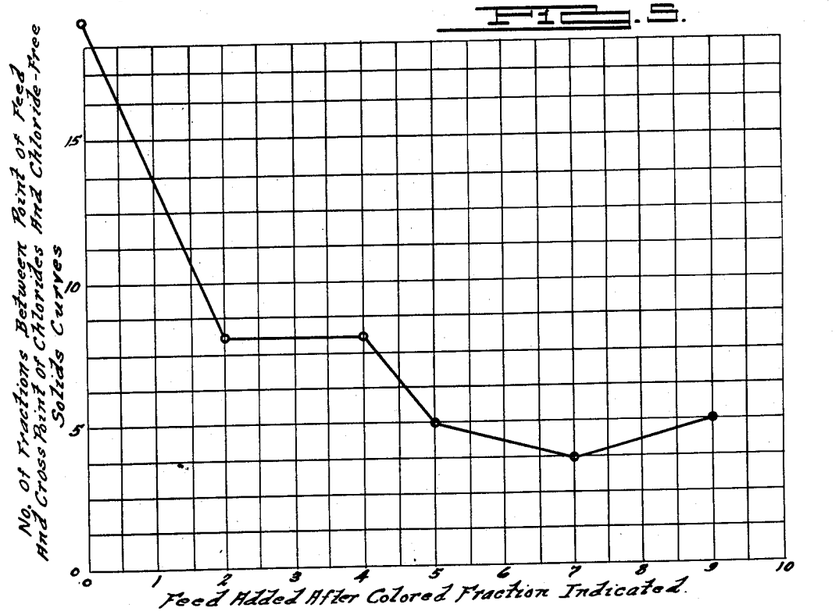

While the fact that the point of adding the new feed hydrolysate affects the degree of separation which is obtained between the fraction high in di-amino acid concentration and the fraction high in monosodium glutamate concentration is well documented, the reason for it is not fully understood. Figure 5 shows in graph form the effect on product separation resulting from changing the point of addition, in the re-cycling procedure, of the new feed hydrolysate. This graph plots the number of fractions between the point of feed and the cross point of the total chlorides and chloride-free solids curves, and the meaning of this selection will be apparent from an inspection of Figure 1. The number of fractions between these two points is a measure of the separation of the fractions high in diamino acid content and monosodium glutamate content because the peak concentration of monosodium glutamate normally approximates the cross point of the total chlorides and chloride-free solids curves. Since Figure 4 illustrated that the new feed should not be added prior to the addition of the second colored fraction, and since the main problem in continuous removal of monosodium glutamate and high diamino product is to maintain adequate separation betwen fractions high in the respective products, it is clear that Figure 5 shows that the best separation occurs when the feed is added after the second to fourth colored fraction from the preceding cycle. Experience has indicated that in order to maintain steady state operation and keep the amino acid separation and concentration high, there should be a minimum of four fractions between the point of feed addition and the cross point of the total chlorides and chloride-free solids curves. It is believed, however, that the point of feed addition to obtain the best degree of separation is at least partially dependent upon the acidity conditions which exist in the resin at the time the feed is added. A partial explanation of this may be obtained by inspecting Figure 1 which shows in dotted lines the pH variation of the effluent as the various fractions are collected. An inspection of this curve will show that as the first fractions which are colored begin to come through the resin, namely fractions 9 or 10, the pH of the effluent is at its lowest point, that is the acidity in the effluent and thus in the column increases, and thereafter slowly starts to rise as additional fractions from the previous cycle are added to the resin. If the 225 ml. feed at pH 3.3 is added first, followed by the recycled effluent fractions 11, 12 and 13, 100 ml. each, having a pH of 2.2 to 2.5, then the over-all pH effect around the feed as it goes through the column, is well below the optimum pH of 3.2 to 4.3. However, if the feed is added after fraction 12 and before 18, the pH of which ranges from 2.7 to 3.0, the over-all average pH effect around the feed in the column then would be close to pH 3.1, which is much closer to the optimum pH range. Figure 2 shows that a pH of 3.1 is far superior for concentrating monosodium glutamate or nitrogen than any pH below 3.0. It is thought that the rapid increase in acidity in the resin is due to some degree of ion exchange action between the lesser ionized amino acid fractions of the hydrolysate with the ion exchange resin with the consequent release of free hydrogen ion, and the increased hydrogen ion appears as an increase in acidity in the effluent fractions collected at that point.

In the conventional manufacture of monosodium glutamate by present day manufacturing techniques, relatively large quantities of low glutamic acid content solutions are discarded. One of the advantageous uses of the method of this invention resides in its ability to concentrate such solutions to glutamic acid concentration levels to make them suitable for recovery and use in the manufacture of monosodium glutamate. For example, a glutamic acid filtrate which would normally be discarded may contain a glutamic acid concentration, calculated as monosodium glutamate, of 1 to 2½ grams per 100 ml. of the hydrolysate. Such a solution can be initially concentrated by boiling off a portion of the water and then by adjusting the pH to near the optimum of 3.3, the filtrate can be cycled through the resin bed of this invention for concentration purposes. By following the techniques above described and recycling the filtrate for a minimum of about 10 cycles, it is possible to raise the glutamic acid concentration of the filtrate to 5 to 7 grams of glutamic acid per 100 ml. calculated as monosodium glutamate, with a corresponding reduction of salt to a level of 1 to 7 grams salt per 100 ml. When the proper selection of the high monosodium glutamate product is removed from each recycle step the concentrated product is comparable to the starting material which has been described above in detail. This concentrated solution can then be evaporated to 23°–31° Baumé and hydrochloric acid added thereto in a proportion of about 0.3–0.4 pound of hydrochloric acid per pound of protein in the material and the solution allowed to cool to room temperature, to crystallize the glutamic acid as the hydrochloride. Or, if preferred, the 23° Bé. to 31° Bé. solution can be adjusted to pH 3.0 to 3.2 to crystallize the glutamic acid directly.

A third alternative for the concentrated monosodium glutamate solution obtained as described above from glutamate wastes is to add this solution to the gluten or other proteinaceous material prior to hydrolyzing with hydrochloric acid. It will then be inter-reacted with hydrochloric acid having a concentration between 15% and 28% by adding thereto an excess of such a hydrochloric acid solution and boiling the mixture at atmospheric pressure for 8–24 hours. The resulting hydrolysate is then filtered, the humin thereby obtained discarded and the filtrate ready for evaporation. The additional hydrolysis has this advantage: some glutamate manufacturing operations have inherent losses of glutamic acid by changes to pyrrolidone carboxylic acid (PCA). The ion exclusion method of concentrating monosodium glutamate also concentrates PCA in the same fractions which have concentrated monosodium glutamate. The additional hydrolysis reverses this to glutamic acid giving an additional substantial yield increase.

As the result of the reacidifying with hydrochloric acid, glutamic acid hydrochloride is produced and upon filtration the glutamic acid hydrochloride crystals are separated from the amino acid filtrate. The amino acid filtrate can be recycled and again reacted with another quantity of 15%–28% hydrochloric acid and refluxed. The glutamic acid hydrochloride crystals may then be dissolved in water, heated and decolorized in a carbon filtration step, then neutralized by adding sodium hydroxide and water thereto to a pH of about 3. This step produces a glutamic acid slurry which upon filtration produces glutamic acid crystals and these crystals upon the addition of an aqueous sodium hydroxide solution to produce a pH of 7.0 produces a monosodium glutamate solution which upon decolorization and evaporation to effect crystallization produces the monosodium glutamate crystalline product.

The process of this invention is applicable to the further concentration of the various amino fractions obtained by the present ion exclusion process, which are recovered as products from a hydrolysed vegetable protein hydrolysates but differing therefrom in using as the starting material for such concentration the product fractions as the starting material. By simply following the process conditions of pH, point of feed addition and effluent discarding and retention, it is possible to efficiently concentrate the amino acid products of the basic process of this invention to an even further degree to make them more valuable as final products.

The process of this invention is applicable, furthermore, to the fractionation and concentration of certain amino acids, such as lysine or glutamic acid, in hydrolysates of other proteins which have unique amino acid compositions, such as blood protein, silk protein, or fish protein. Also very low cost proteins can be used in this invention to concentrate valuable amino acids in order to upgrade the constituent amino acids into more valuable form.

The example set forth below represents typically suitable operating conditions for operating the method of this invention on a continuous basis and in a steady state condition when using wheat protein hydrolysate obtained from the treatment of wheat gluten with hydrochloric acid.

EXAMPLE I

An operating column was set up and operated on a continuous basis with product removal for a period of time of approximately 10 weeks. The products produced during this run were a high diamino fraction, a high monosodium glutamate fraction, crystalline aspartic acid and two different fractions high in neutral amino acids.

The raw material used during this run was a wheat protein hydrolysate produced by the hydrochloric acid hydrolysis of wheat gluten by inter-reacting the same with 20% hydrochloric acid and boiling the mixture at atmospheric pressure for 16 hours. The hydrolysate thus produced was filtered, the humin discarded and the filtrate evaporated to 23–31° Bé. Additional hydrochloric acid equivalent to about 0.3–0.4 pound of hydrochloric acid per pound of protein was added while the concentrated filtrate was still hot and mixed in and allowed to cool. The mixed material was then filtered to separate the amino acid filtrate from the glutamic acid hydrochloride crystals. The filtrate from this filtration step was the raw material for this particular example. The amino acid filtrate was boiled to remove the excess hydrochloric acid and the pH of the resulting material adjusted to 3.3 with sodium hydroxide, cooled, and aged several weeks and filtered. This filtrate was the starting material for this continuous run.

An eight-inch diameter column was filled with Dowex 50 X–4 resin to a height of 36 inches, the resin having a mesh size between 50 and 100. The resin in the bed was then equilibrated with the feed hydrolysate by introducing the hydrolysate into the top of the resin, using a spreading device, as described above, and the addition was continued until the gravity, pH and color of the effluent closely approached the gravity, pH and color of the feed hydrolysate. About 125% of the settled resin volume was required. The feed was then discontinued, the column washed with water until the gravity of the effluent approached 0° Bé. The resin was then backwashed and drained just to the surface of the resin and the column considered ready for the beginning of the operation.

The first cycle was started by adding 6000 ml. of the feed hydrolysate to the column. The hydrolysate contained 6.6% monosodium glutamate and 13.1% nitrogen by weight based on the chloride-free solids. Effluent fractions of 1900 ml. each were collected starting at the instant the feed was first added to the column, and these were numbered from #1 consecutively. As the last of the hydrolysate feed disappeared from the surface of the resin, water was added to elute the feed hydrolysate through the resin. The water used had been softened such that the calcium and magnesium had been converted into a sodium form.

Figure 7:
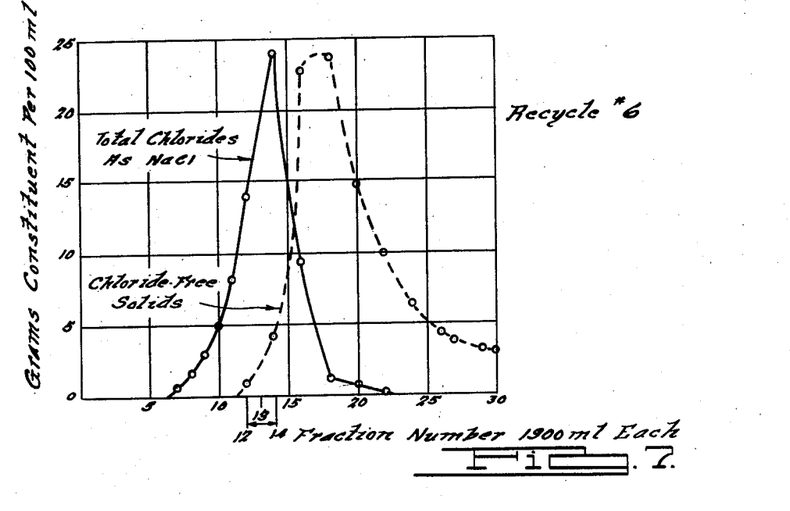
Figure 8:
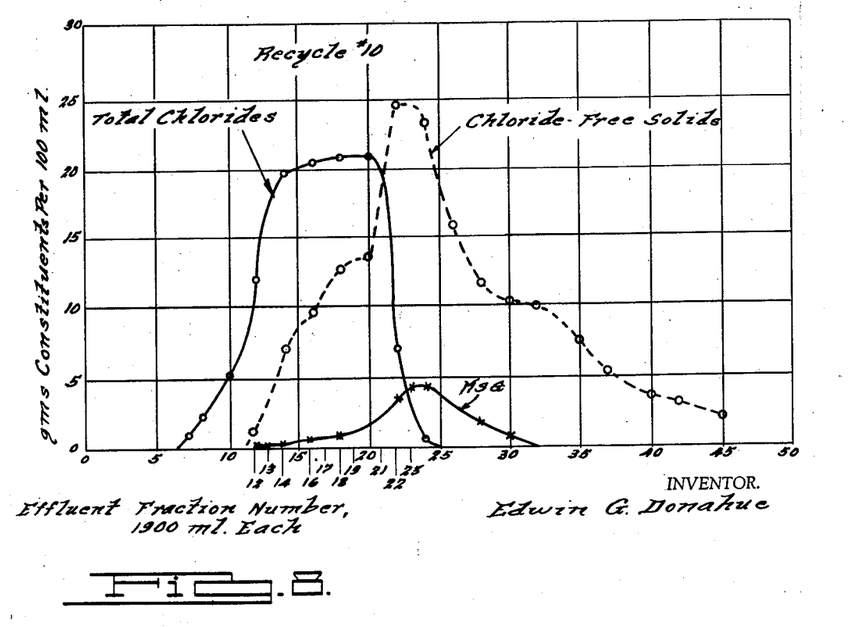

The first 6 fractions were water which was displaced from the column and all were discarded. Fractions through #12 contained high salt and were also discarded. Fractions 13, 14, 15, 16, 17, 18, 19 and 20 were collected and retained. The gravity reached on fraction 13 was 6.6° Baumé while the gravity of fraction 20 was 0.6° Baumé. The column was backwashed, allowed to settle, and the water drained off just to the surface of the resin. The first cycle effluent fractions #13 and 14 were added to the top of the resin column and as soon as #14 fraction solution disappeared from the surface 4250 ml. of feed hydrolysate was added and then fractions 15, 16, 17, 18, 19 and 20 were added in sequence, each fraction being added just at the instant that the preceding fraction disappeared from the surface of the resin. As fraction 20 disappeared from the surface of the resin an additional quantity of softened water was added to the column. As in the first cycle, the effluent fractions were collected, with the same discarding of fractions 1 through 12, and the fractions beginning with #13 and ending with #28 were collected and saved. The gravity of fraction #13 was 11.6° Baumé and that of fraction #28 was 0.8° Baumé. The column was then backwashed, settled and drained, and as in the first recycle operation retained effluent fractions 13 and 14 were fed to the column prior to the addition of the feed hydrolysate in the same quantity as before, namely 4250 ml. The new feed fraction was followed with retained fractions 15–28 and at the disappearance of the last of fraction 28 from the surface, additional water was added to elute the hydrolysate through the resin. The same procedure in the collection of the fractions including the discarding of the same number of fractions and saving all of the fractions thereafter was followed as in the second cycle step. The same procedure was repeated in recycling the retained fractions except that no fractions beyond #38 were recycled after recycle step #5 in the interest of keeping the quantity being handled to a reasonable maximum. All of the fractions beyond #38 were retained and ultimately concentrated by evaporation and thereby became a part of product #3, namely the fraction high in neutral amino acids. The concentrations of the various ingredients in the effluent fractions at the end of cycle #6 and at the end of cycle #10 are shown in the drawings as Figures 7 and 8, respectively.

Beginning with the effluent fractions collected from cycle #10, product removal was started. Three products were removed. The fractions beyond #38 to the point where the Baumé was 0.5° or below was continued, as had been done from cycle #5 as described above. This product (called product C) had a volume of approximately five fractions, or 9500 ml. and had an over-all gravity of 1.4° Baumé. A second product high in monosodium glutamate was taken; the volume removed at first was 1500 ml., but later was reduced to 1300 ml., the reasons for doing so and the fractions from which it was removed are discussed below. A third product was removed, which by nitrogen analysis and paper chromatography indicated contained concentrates of the diamino acids. This product volume removal was from 1900 ml. to 3800 ml., and was usually taken from fractions 15, or 14 and 15. When 1500 ml. was removed from fraction 25 for the high glutamate product, it was continued at this level for four cycles. The gravity was seen to get lower, so a shift was made to fraction #24. This was continued until cycle #21 showed a shift of much too high gravity and too much salt in #24. No. 26 seemed to be the one from which to remove this product, by the salt content, gravity and monosodium glutamate content. Beginning with cycle #22 it was decided to try to shift the high monosodium glutamate product to fraction 23 or 24, and to do this by removing larger amounts of the high diamino product out of fractions 14, 15 and 16. It may be seen, that by the time cycle #25 was reached the high monosodium glutamate product was being repeatedly taken from fraction #23. At the same time, however, the monosodium glutamate had been reduced to 15.5%, and the trend was still downward. Therefore, it was decided to reduce the high monosodium glutamate product removal from 1500 ml. to 1300 ml. The result shows that the monosodium glutamate content was again raised. Continuation of these same control techniques to the end of cycle 99, enabled the retention of the high monosodium glutamate product removal within the range of fractions 22 and 24. When this product removal procedure had been utilized for a few recycles, it was noted that aspartic acid was spontaneously crystallizing from fractions 20 and 21 and could be readily separated from those fractions by filtration before the solution was returned to the bed during the next cycle.

The data which show these changes in product concentration as the steady state condition is reached, as described, are set forth below in Table 4.

From an inspection of the above data it may be seen that by the time cycle 20 had been reached the chloride concentration of 0.8 gram chloride per 100 ml. was so high that it was desirable to extract the B product from a later fraction containing less chloride and thus fraction 26 was selected. Since fraction 26 produced a product much lower in monosodium glutamate than fraction 24, the mechanism of reducing the chloride by increasing the quantity of A product in cycles 22 through 26 provides success in reducing the chloride content even in fraction 23. By reducing the quantity isolated from fraction 23 on each cycle it was possible to increase the percent of monosodium glutamate back to near the original level. By similar minor alterations in the quantity of the fractions isolated as product and the point at which such selection is made, it is relatively easy to maintain the recycling system in a steady state operating condition.

The products removed, as streams, from the above described recycling system were periodically analyzed and a comparison between the tenth recycle effluent and the 29th recycle effluent are given below. The analysis set forth for the 29th recycle effluent was maintained without substantial change through the 99th recycle.

*Table 5.—10th recycle effluent*

| | Product A (High Diamino Acid Product) | Product B (High Monosodium Glutamate Product) | Product C (High Neutral Amino Acid Product) |
|---|---|---|---|
| Fraction Taken | 15 | 25 | 39–45 |
| Ml. Removed | 1,900 | 1,500 | 11,400 |
| Solids, gms. per 100 ml | 28.2 | 19.0 | 3.5 |
| Chlorides calcd. as NaCl, gms./100 ml | 19.7 | 0.6 | 0.1 |
| Chloride Free Solids, gms./100 ml | 8.5 | 18.4 | 3.4 |
| MSG, gms./100 ml | 0.5 | 3.9 | |
| MSG, percent of chloride free solids | 5.9 | 21.2 | |
| N, percent of chloride free solids | 19.7 | 10.5 | 12.5 |
| pH | 2.5 | 4.1 | 6.2 |
| Bé | 18.4 | 8.2 | 1.4 |

*Table 6.—29th recycle effluent*

| | Product A (High Diamino Acid Product) | Product B (High Monosodium Glutamate Product) | Product C (High Neutral Amino Acid Product) |
|---|---|---|---|
| Fraction Taken | 15 | 23 | 39–44 |
| Ml. removed | 1,900 | 1,300 | 9,500 |
| Solids, grams./100 ml | 34.2 | 19.5 | 3.5 |
| Chlorides, calcd. as NaCl, gms./100 ml | 22.0 | .3 | 0.1 |
| Chloride free solids, gms./100 ml | 12.2 | 19.2 | 3.4 |
| MSG, gms./100 ml | 0.9 | 3.2 | |
| MSG, percent of chloride free solids | 7.3 | 16.7 | |
| N, Percent of chloride free solids | 18.9 | 9.9 | 12.5 |
| pH | 2.6 | 4.2 | 6.2 |
| Bé | 21.0 | 10.4 | 1.4 |

*Table 4*

| Cycle No. | A Product (High Diamino Acid Product) | | | B Product (High Monosodium Glutamate Product) | | | | |
|---|---|---|---|---|---|---|---|---|
| | Fraction No. | Bé. | Ml. Removed | Fraction No. | Bé. | Grams Cl/100 ml. | Percent MSG Based on Cl Free Solids | Ml. Removed |
| 10 | 15 | 18.4 | 1,900 | 25 | 10.3 | 0.6 | 21.2 | 1,500 |
| 11 | 15 | 19.4 | 1,900 | 25 | 8.9 | 0.6 | 18.4 | 1,500 |
| 12 | 15 | 19.5 | 1,900 | 25 | 9.3 | 0.6 | 18.4 | 1,500 |
| 13 | 15 | 19.4 | 1,900 | 25 | 8.5 | 0.2 | 18.4 | 1,500 |
| 14 | 15 | 19.5 | 1,900 | 24 | 11.1 | 0.7 | 18.9 | 1,500 |
| 15 | 15 | 20.5 | 1,900 | 24 | 10.0 | 0.4 | 18.9 | 1,500 |
| 19 | 15 | 20.8 | 1,900 | 24 | 10.5 | 0.3 | 17.5 | 1,500 |
| 20 | 15 | 17.0 | 1,900 | 24 | 11.0 | 0.8 | 18.6 | 1,500 |
| 21 | 15 | 18.4 | 1,900 | 26 | 9.6 | 0.5 | 16.8 | 1,500 |
| 22 | 15 | 19.0 | 1,900 | 26 | 8.5 | 0.4 | 16.8 | 1,500 |
| | 16 | 19.5 | 1,900 | | | | | |
| 23 | 14 | 20.0 | 1,900 | 24 | 9.2 | 0.1 | | none |
| | 15 | 21.0 | 1,900 | | | | | |
| 24 | 15 | 19.5 | 1,900 | 25 | 8.9 | | | none |
| 25 | 14 | 17.9 | 250 | 23 | 11.2 | 0.6 | 15.5 | 1,300 |
| | 15 | 19.5 | 1,900 | | | | | |
| 26 | 14 | 18.4 | 250 | 23 | 10.4 | 0.5 | 15.5 | 1,300 |
| | 15 | 19.8 | 1,900 | | | | | |
| 27 | 15 | 20.0 | 1,900 | 23 | 10.4 | 0.6 | 15.5 | 1,300 |
| 28 | 15 | 21.2 | 1,900 | 23 | 10.9 | 0.6 | 15.5 | 1,300 |
| 29 | 15 | 21.0 | 1,900 | 23 | 10.4 | 0.3 | 15.5 | 1,300 |
| 31 | 15 | 21.0 | 1,900 | 23 | 10.7 | 0.4 | 18.1 | 1,300 |
| 32 | 15 | 21.3 | 1,900 | 23 | 11.4 | 0.4 | 18.1 | 1,300 |
| 33 | 14 | 17.8 | 950 | 23 | 12.0 | 0.9 | 18.1 | 1,300 |
| | 15 | 19.3 | 1,900 | | | | | |
| 34 | 14 | 18.6 | 950 | 23 | 11.0 | 0.6 | 18.1 | 1,300 |
| | 15 | 19.0 | 1,900 | | | | | |
| 35 | 15 | 20.2 | 1,900 | 23 | 9.8 | 0.2 | 16.4 | 1,300 |

A material balance on the 10th recycle effluent provided the following important comparative figures. The feed contained 8550 grams sodium chloride, 1400 grams ammonium chloride, 693 grams monosodium glutamate, 1360 grams ammonia-free nitrogen, 10,400 grams of chloride-free solids and contained 13.1% nitrogen and 6.66% monosodium glutamate, based on the chloride-free solids. The materials recovered by saving the 12th through the 45th fractions, of 1900 ml. each, included 3210 grams sodium chloride, 554 grams ammonium chloride, 636 grams monosodium glutamate, 840 grams ammonia-free nitrogen and 7744 grams chloride-free solids, and these totals represented a recovery of 37.5% of the sodium chloride, 39.6% of the ammonium chloride, 92% of the monosodium glutamate and 74.4% of the chloride-free solids.

Final products were produced from each of the three product fractions removed in the above processing by concentrating and treating the total collected product quantities as follows. Product A, the product rich in high diamino acids was concentrated by boiling, under vacuum to the point at which the solution at 25° C. has a gravity of 29° Bé. The concentrated solution, when cool, is filtered and the filtrate neutralized to a pH of 6–6.2 and this neutral product aged a few weeks and thereafter filtered to remove solids. The filtrate is a liquid concentrate having an analysis corresponding to that set forth below for product A in the left-hand column. Due to the variations in the conditions above discussed, product A may vary in its composition as set forth in the two right-hand columns.

PRODUCT A

|  | Liquid Basis, Percent by Weight | | Dry Basis, Percent by Weight |
|---|---|---|---|
| Arginine | 2.4 | 1.5–6.0 | 2.5–20.0 |
| Lysine | 1.3 | 1.0–5.0 | 1.5–16.5 |
| Histidine | 1.0 | 0.5–5.0 | 0.8–16.5 |
| Monosodium glutamate | 1.9 | 1.0–3.0 | 1.5–10.0 |
| Sodium Aspartate | 1.3 | 1.0–3.0 | 1.5–10.0 |
| NaCl | 13 | 0–20.0 | 0.0–65.0 |
| NH₄Cl | 6 | 0–10.0 | 0.0–33.0 |
| Water | 55.8 | 30–60 | |
| pH | 5.9–6.1 | 5–7 | |
| Nitrogen | 6 | 4–7 | 6.0–23.5 |
| Solids | 44 | 30–65 | |
| Gravity | 26.4° Bé. (1.222 sp. gr.) | 23°–32° Bé. (1.188–1.28 sp. gr.) | |

This product may vary from 0 to 75% moisture.

This product is a dark amber liquid which is miscible with water in all proportions and has a salty, distinctly lingering, meaty taste. It is excellent as a chop suey sauce or a base for consomme. It is considerably higher in lysine than the original hydrolyzed protein from which it is derived and it can be used as a supplement in geriatric foods to produce a food balanced in amino acids, vitamins and minerals. If desired, the salt content of this product can be removed by the additional steps of spray drying and adding an excess of glacial acetic acid to thereby precipitate the salt. The acetic acid can then be separated by distilling to leave a product substantially salt free and unusually high in lysine and arginine.

The product solution labeled product B and rich in monosodium glutamate was concentrated by evaporating, under vacuum, until it had a gravity of 26.5° Bé. at 25° C. The concentrate is neutralized to a pH of 6 to 6.3, aged for at least a week and filtered. This filtrate end product has an analysis set forth below as product B in the left-hand column. Variations in product B composition are set forth in the right-hand columns.

PRODUCT B

|  | Paste Basis, Percent by Weight | | Dry Basis, Percent by Weight |
|---|---|---|---|
| Monosodium glutamate | 13.4 | 10–60 | 12.5–67.0 |
| Proline | 9.2 | 3–12 | 4.0–13.5 |
| Serine | 9.2 | 3–12 | 4.0–13.5 |
| Sodium Aspartate | 8.9 | 3–12 | 4.0–13.5 |
| Threonine | 3.6 | 2–5 | 2.5–5.5 |
| Alanine | 3.6 | 2–5 | 2.5–5.5 |
| Glycine | 3.1 | 2–5 | 2.5–5.5 |
| Arginine | 3.1 | 0–4 | 0.0–4.5 |
| Histidine | 1.4 | 0–2 | 0.0–2.2 |
| Lysine | 0.3 | 0–1 | 0.0–1.1 |
| Salt | 2.6 | 0–45.0 | 0.0–50.0 |
| Water | 15.0 | 10–20 | |
| pH | 5.6 | 5–7 | |

This product may have water present from 0–75%.

This product is a translucent amber paste, freely soluble in water and possessing a tart, pleasant, beef-like flavor. When this product is mixed with yeast extract it makes a good substitute for beef extract for addition to soups, etc. The product is more heat stable than most hydrolyzed protein products and can be added without deterioration in commercial canning operations.

Product C, the product high in neutral amino acids, was concentrated under vacuum until the solution had a gravity of 21° Bé. The solution was aged a week and then filtered and the filtrate end product has the analysis set forth below for product C in the left-hand column, with variations in composition appearing in the two right-hand columns. The filter cake obtained from the filtration step after the concentration of product C contains the less soluble neutral amino acids and is an end product having an analysis corresponding to that set forth for product D, in the left-hand column, with variations in composition being shown in the right-hand column.

PRODUCT C

|  | Paste Basis, Percent by Weight | | Dry Basis, Percent by Weight |
|---|---|---|---|
| Proline | 37.4 | 20–50 | 25.0–55.0 |
| Serine | 11.0 | 10–20 | 12.5–22.0 |
| Threonine | 6.0 | 4–20 | 5.0–22.0 |
| Glycine | 7.7 | 5–10 | 6.3–12.5 |
| Alanine | 6.5 | 5–10 | 6.3–12.5 |
| Monosodium glutamate | 0.5 | 0–3 | 0.0–3.3 |
| Salt | 0.1 | 0–1.0 | 0–1.1 |
| Sodium Aspartate | 0.0 | 0–1.0 | 0.0–1.1 |
| Water | 15.0 | 10–20.0 | |
| pH | 5.8 | 5–7.0 | |

This product may have water present from 0–75%.

This product is a tan colored paste, freely soluble in water and has a pleasant caramel-like odor and a sweet flavor with a trace of bitterness. It may be used in tobacco curing and flavoring, low sodium food use, as a chocolate extender, has some utility as a chelating agent and as a raw material for separation of proline, serine and threonine.

PRODUCT D

|  | Percent by Weight | |
|---|---|---|
| Proline | 17.3 | 5–20 |
| Leucine | 11.9 | 5–20 |
| Phenylalanine | 15.7 | 10–25 |
| Isoleucine | 10.5 | 5–20 |
| Valine | 11.5 | 5–20 |
| Serine | 6.0 | 2–12 |
| Threonine | 3.0 | 2–8 |
| Glycine | 3.6 | 2–8 |
| Methionine | 3.3 | 2–8 |
| Alanine | 3.1 | 2–8 |
| Tyrosine | 1.4 | 0–3 |
| Cystine | 0.7 | 0–3 |
| Monosodium glutamate | 0.2 | 0–3 |
| Salt | 0.2 | 0–3 |
| Water | 4.0 | 0–10 |
| pH | 5.8 | 5.5–7.0 |

This product may have water present from 0–75% if a preservative is added.

This product is a light cream colored powder which is soluble in water to the extent of about 10%. It possesses a sweet but bitter taste and is useful as additives in coffee, chocolate, cheese, etc., where a slight bitterness is desirable.

What is claimed is:

1. A method for concentrating amino acids in a protein hydrolysate which comprises the steps of adjusting the pH of said hydrolysate to a value within the range of about 3.2 to about 4.3, adjusting the chloride content of said hydrolysate to within the range of about 17 grams/100 ml. to saturation to thereby form a feed hydrolysate, feeding the said hydrolysate to a water-immersed bed of an ion exchange resin, eluting the said feed hydrolysate through said bed with water, collecting the effluent from said bed in fractions having a size within the range of 2% to 16% of the volume of said resin bed, collecting and discarding the fractions of effluent from said bed which contain substantially no chloride-free solids, collecting and retaining the succeeding fractions displaced from said bed until the gravity of said retained fractions reaches about 0.5° Bé., and recycling through said bed the said retained fractions by refeeding the same to said bed in the same sequence in which they were collected, and feeding a new quantity of said feed hydrolysate to said bed immediately following one of said retaining fractions between the second and eighth of said retained fractions.

2. A method for concentrating amino acids in a protein hydrolysate which comprises the steps of adjusting the pH of said hydrolysate to a value within the range of about 3.2 to about 4.3, adjusting the chloride content of said hydrolysate to within the range of about 17 grams/100 ml. to saturation to thereby form a feed hydrolysate, feeding the said hydrolysate to a water-immersed bed of an ion exchange resin, eluting the said feed hydrolysate through said bed with water, collecting the effluent from said bed in fractions having a size within the range of 8% to 10% of the volume of said resin bed, collecting and discarding the fractions of effluent from said bed which contain substantially no chloride-free solids, collecting and retaining the succeeding fractions displaced from said bed until the gravity of said retained fractions reaches about 0.5° Bé., and recycling through said bed the said retained fractions by refeeding the same to said bed in the same sequence in which they were collected, and feeding a new quantity of said feed hydrolysate to said bed immediately following one of said retained fractions between the second and eighth of said retained fractions.

3. A method for concentrating amino acids in a protein hydrolysate which comprises the steps of adjusting the pH of said hydrolysate to a value within the range of about 3.2 to about 4.3, adjusting the chloride content of said hydrolysate to within the range of about 17 grams/100 ml. to saturation to thereby form a feed hydrolysate, feeding the said hydrolysate to a water-immersed bed of an ion exchange resin, eluting the said feed hydrolysate through said bed with water, collecting the effluent from said bed in fractions having a size within the range of 2% to 16% of the volume of said resin bed, collecting and discarding the fractions of effluent from said bed which contain substantially no chloride-free solids, collecting and retaining the succeeding fractions displaced from said bed until the gravity of said retained fractions reaches about 0.5° Bé., and recycling through said bed the said retained fractions by refeeding the same to said bed in the same sequence in which they were collected, feeding a new quantity of said feed hydrolysate to said bed immediately following one of said retained fractions between the second and eighth of said retained fractions, and repeating the recycling of said retained fractions for at least 5 recycles.

4. A method for concentrating amino acids in a protein hydrolysate which comprises the steps of adjusting the pH of said hydrolysate to a value within the range of about 3.2 to about 4.3, adjusting the chloride content of said hydrolysate to within the range of about 17 grams/100 ml. to saturation to thereby form a feed hydrolysate, feeding the said hydrolysate to a water-immersed bed of an ion exchange resin, eluting the said feed hydrolysate through said bed with water, collecting the effluent from said bed in fractions having a size within the range of 2% to 16% of the volume of said resin bed, collecting and discarding the fractions of effluent from said bed which contain substantially no chloride-free solids, collecting and retaining the succeeding fractions displaced from said bed until the gravity of said retained fractions reaches about 0.5° Bé., and recycling through said bed the said retained fractions by refeeding the same to said bed in the same sequence in which they were collected, feeding a new quantity of said feed hydrolysate to said bed immediately following one of said retained fractions between the second and eighth of said retained fractions, repeating the recycling of said retained fractions for at least 10 recycles, analysing the retained fractions for chlorides, chloride-free solids and monosodium glutamate and isolating at least a portion of the fractions containing the maximum concentration in monosodium glutamate and at least a portion of the fractions containing concurrently the maximum of chloride free solids and the minimum of monosodium glutamate, said chloride-free solids comprising diamino acids and neutral amino acids.

5. A method in accordance with claim 4 wherein the quantities of isolated product fractions removed from the recycled stream after new feed has been added are such that the nitrogen analysis of said fractions is 16%–20% nitrogen for the diamino acids fraction, 11.5%–13% nitrogen for the neutral amino acids fraction and 7%–10% nitrogen for the monosodium glutamate fraction.

6. A method in accordance with claim 5 wherein the monosodium glutamate fraction is removed from the effluent at pH 4.0–4.1, thereby obtaining a product fraction having a relatively high monosodium glutamate concentration and a relatively low salt concentration, and wherein the diamino acids product fraction is removed at least four fractions before removing the monosodium glutamate product fraction.

7. A method for concentrating amino acids in a protein hydrolysate which comprises the steps of adjusting the pH of said hydrolysate to a value within the range of about 3.2 to about 4.3, adjusting the chloride content of said hydrolysate to within the range of about 17 grams/100 ml. to saturation to thereby form a feed hydrolysate, feeding the said hydrolysate to a water immersed bed of an ion exchange resin, eluting the said feed hydrolysate through said bed with water, collecting the effluent from said bed in fractions having a size within the range of 2%–16% of the volume of said resin bed, collecting and discarding the fractions of effluent from said bed which contained substantially no chloride-free solids, collecting and retaining the succeeding fractions displaced from said bed until the gravity of said retained fractions reaches about 0.5° Bé., and recycling through said bed the said retained fractions by refeeding the same to said bed in the same sequence in which they were collected and feeding a quantity of new feed hydrolysate between about 5% and 40% of the volume of said bed to the said bed immediately following the feeding of one of said retained fractions between the second and eighth of the said retained fractions.

8. A method for concentrating amino acids in a protein hydrolysate which comprises the steps of (1) adjusting the pH to a value within the range of about 3.2 to about 4.3, (2) adjusting the chloride content of said hydrolysate to within the range of about 20 grams/100 ml. to saturation to thereby form a feed hydrolysate, (3) feeding the said hydrolysate to a water-immersed bed of an ion exchange resin, (4) eluting the said feed hydrolysate through said bed with water, (5) collecting the effluent from said bed in fractions having a size within the range of 2% to 16% of the volume of said resin bed, (6) collecting the fractions of effluent from said bed which contain substantially no chloride-free solids and discarding the same, (7) collecting and retaining the fractions which successively follow the said fractions containing substantially no chloride-free solids until the gravity of said retained fractions reaches about 0.5° Bé., (8) recycling at least two and not more than eight of said retained fractions by feeding the said fractions to said bed in the same sequence in which they were collected and (9) adding a quantity of new feed hydrolysate equal in volume to between 5% and 40% of said resin bed volume after the second and before the 8th recycled fraction, and following the feed with the balance of the fractions collected in step #7, (10) repeating steps 6, 7, 8 and 9 for at least 10 recycles, (11) isolating at least a portion of the fractions containing therein the maximum of chloride-free solids and the minimum of monosodium glutamate until the isolated fractions contain substantially no chlorides, (12) isolating at least a portion of the fractions containing therein maximum concentrations of monosodium glutamate until the gravity of the fractions being isolated reaches about 13° Bé., and (13) isolating at least a portion of the fractions containing the maximum concentrations of neutral amino acids until the gravity of the fractions being isolated reaches about 0.5° Bé., the total quantity of amino acids isolated in steps 11, 12 and 13 being regulated so as to be substantially equal to the amino acids added in the new feed hydrolysate in each subsequent recycle.

9. A method in accordance with claim 8 wherein the product isolated in step 11 thereof is used as the starting material and is cycled through an ion exchange resin bed by feeding the same through said bed, eluting the feed through said bed with water, collecting and discarding the fractions of effluent from said bed which contain substantially no chloride-free solids and recycling the balance of the effluent from said bed until the diamino acid concentration in said effluent is increased from about 2–6 times the concentration of said starting material on a salt-free basis.

10. A method in accordance with claim 8 wherein the product isolated in step 12 thereof is used as the starting material and is cycled through an ion exchange resin bed by feeding the same through said bed, eluting the feed through said bed with water, collecting and discarding the fractions of effluent from said bed which contain substantially no chloride-free solids and recycling the balance of the effluent from said bed until the monosodium glutamate concentration in said effluent is increased from about 2–6 times the concentration of said starting material on a salt-free basis.

11. A method in accordance with claim 8 wherein the product isolated in step 13 thereof is used as the starting material and is cycled through an ion exchange resin bed by feeding the same through said bed, eluting the feed through said bed with water, collecting and discarding the fractions of effluent from said bed which contain substantially no chloride-free solids and recycling the balance of the effluent from said bed until the neutral amino acid concentration in said effluent is increased from about 2–6 times the concentration of said starting material on a salt-free basis.

12. A method in accordance with claim 1 wherein said protein hydrolysate contains about 1 to 2½ grams/liter monosodium glutamate and said recycling is continued a sufficient number of cycles to raise the level of monosodium glutamate in the fractions containing the maximum concentration of monosodium glutamate to at least about 5 grams of glutamic acid per 100 ml., calculated as monosodium glutamate.

References Cited in the file of this patent

UNITED STATES PATENTS

| | | |
|---|---|---|
| 2,049,576 | Ungnade | Aug. 4, 1936 |
| 2,375,164 | Bennett | May 1, 1945 |
| 2,429,666 | Block | Oct. 28, 1947 |
| 2,480,654 | Howe et al. | Aug. 30, 1949 |
| 2,666,080 | Xander | Jan. 12, 1954 |
| 2,710,858 | Block | June 14, 1955 |

OTHER REFERENCES

Block et al.: The Amino Acid Composition of Proteins and Foods, pp. 300–309 (1947).